(12) United States Patent
Hines, III

(10) Patent No.: US 8,818,324 B1
(45) Date of Patent: Aug. 26, 2014

(54) LOCATION CAPABILITY PROVISIONING

(75) Inventor: Thomas Edward Hines, III, Belton, MO (US)

(73) Assignee: Sprint Communications Company L.P., Overand Park, KS (US)

( * ) Notice: Subject to any disclaimer, the term of this patent is extended or adjusted under 35 U.S.C. 154(b) by 1436 days.

(21) Appl. No.: 11/567,013

(22) Filed: Dec. 5, 2006

(51) Int. Cl.
| | |
|---|---|
| H04M 11/04 | (2006.01) |
| H04W 24/00 | (2009.01) |
| H04B 7/00 | (2006.01) |
| H04B 1/38 | (2006.01) |
| G06F 17/00 | (2006.01) |
| G06F 7/00 | (2006.01) |

(52) U.S. Cl.
USPC ............... 455/404.2; 455/521; 455/456.1; 455/90.1; 455/404.1; 707/687; 707/690; 707/700

(58) Field of Classification Search
CPC ...... H04W 4/22; H04W 64/00; H04W 76/007

USPC ............ 455/521, 456, 90.1, 404.1, 404.2; 707/101–104.1, 202, 1–10, 687, 690, 707/700; 370/352
See application file for complete search history.

(56) References Cited

U.S. PATENT DOCUMENTS

| | | | |
|---|---|---|---|
| 6,185,569 B1 * | 2/2001 | East et al. | 707/101 |
| 2004/0190497 A1 * | 9/2004 | Knox | 370/352 |
| 2006/0014517 A1 * | 1/2006 | Barclay et al. | 455/404.2 |

* cited by examiner

*Primary Examiner* — Opiribo Georgewill

(57) ABSTRACT

A provisioning system for processing data structures to determine if location capabilities indicated in records are correct for each of the different ranges indicated in each of the records, transferring the data structure to a location determination system if each of the location capabilities are correct, and generating an error response if each of the location capabilities are not correct.

16 Claims, 7 Drawing Sheets

| | LOW END | HIGH END | MPCAP |
|---|---|---|---|
| RANGE A | X1 | Y1 | 1 |
| RANGE B | X2 | Y2 | 3 |
| RANGE C | X3 | Y3 | 2 |
| RANGE n | Xn | Yn | Zn |

FIG. 6

LOCATION CAPABILITY PROVISIONING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to provisioning location capability information in a communication network.

2. Description of the Prior Art

Location determination capabilities have become important to the operation of modern telecommunication networks. In the case of providing emergency services, such as servicing 911 calls, most carriers have a multitude of capabilities present in their networks for determining the location of a caller. Often times, which capability the carrier uses to locate a caller depends upon the location capabilities of the device used by the caller. For instance, some devices are enabled with global positioning system features, while other devices are not. Thus, a carrier is limited to using those capabilities in its network that are compatible with the device at issue. Unfortunately, a carrier network is often provisioned with unreliable information that can be used to correctly select a location determination capability.

FIG. 1 illustrates communication network 100 in an example of the prior art whereby crucial information could be misprovisioned. Communication network 100 includes caller 101 in communication with mobile switching center (MSC) 121 over backhaul network 111. Caller 101 is a mobile wireless caller. MSC 121 is operatively coupled to public safety answering point (PSAP) 141 and PSAP 151 over local network 112. MSC 121 is also operatively coupled to location provisioning system (LPS) 130, and in particular, to mobile positioning center (MPC) 132. MPC 132 is operatively coupled to mobile application provisioning system (MAPS) 134, position determining equipment (PDE) 133, and LPS gateway 135. PSAP 141 is operatively coupled to LPS gateway 135, as is PSAP 151.

In an operational example of the prior art, caller 101 could encounter a situation that requires an emergency service. Caller 101 could responsively place a 911 call to MSC 121. MSC 121 recognizes the call as requesting emergency services and initiates multiple call processes to handle the 911 call. One call process involves MSC 121 communicating via local network 112 with either PSAP 141 or PSAP 151 to setup the 911 call between caller 101 and the appropriate PSAP. For this example, it is assumed that PSAP 141 is the appropriate PSAP.

Another call process involves MSC 121 communicating with MPC 132 to initiate a location determination process in order to physically locate caller 101. MPC 132 communicates with PDE 133 to locate caller 101. A number of location applications could be utilized or executed by PDE 133 to locate caller 101, depending upon the positioning capabilities of the device used by caller 101. PDE 133 returns the location of caller 101 to MPC 132 for later distribution.

Eventually, MSC 121 connects the emergency call through to PSAP 141. As part of the call setup process, MSC 121 requests a key from MPC 132 that is used to track the call and correlate information on the call. MSC 121 forwards the key to PSAP 141 during call setup. PSAP 141 queries LPS gateway 135 with the key to obtain location information generated by the location determination processes initiated by MPC 132. LPS gateway 135 typically interfaces between multiple PSAPs and multiple MPCs.

In this example, LPS gateway 135 obtains the location of the caller from MPC 132 and returns the location information to PSAP 141. Emergency personnel can then be directed by PSAP 141 to the location of caller 101.

MPC 132 typically processes data structures that hold or store a list of devices, often times identified by a device identifier, along with various attributes of each device, such as the location or positioning determining capability or capabilities of each device. The data structures are often times in the form of call processing tables, database, or the like. Examples of positioning capabilities include global positioning system (GPS) capabilities, triangulation capabilities, or a hybrid combination of both capabilities.

When a location determination process is initiated, MPC 132 internally queries a device list to determine the positioning capabilities of the device for which a location is sought. Depending upon the capability of the device, MPC 132 instructs PDE 133 to seek the location accordingly. For example, if a device has GPS capabilities, MPC 132 instructs PDE 133 to utilize a GPS application to locate the device. If the device lacks GPS capabilities, but does have limited triangulation capabilities, MPC 132 instructs PDE 133 to locate the device utilizing triangulation techniques. Other location or positioning determining techniques or processes are known.

MAPS 134 is typically used as a provisioning system for the data structures processed by MPC 132 when determining the positioning capabilities of mobile devices. MPC 132 is programmed or otherwise configured to periodically access MAPS 134 to update internal data structures, such as those tables or databases holding device positioning capability information.

The data structures stored in MAPS 134 are typically data filled by human operators and therefore significant errors can exist within the data structures. In one problematic example, the device capability of a range of devices could be incorrectly input into a particular table or other such data structure stored in MAPS 134. As a result, incorrect data is frequently loaded into MPC 132 for use during location determination processes.

SUMMARY OF THE INVENTION

An embodiment of the invention helps solve the above problems and other problems by providing systems, methods, and software for improving the data provisioning process for location capability information. In an embodiment of the invention, a method of operating a communication system comprises, in a call processing system, receiving from a device a call request for emergency service indicating a device identifier, processing the call request to setup a call for the emergency service between the device and a public safety answering point, and transferring an initiation request including the device identifier to a location determination system to initiate a first determination process to determine a location of the device.

The method further comprises, in the location determination system, receiving a data structure from a provisioning system, receiving the initiation request from the call processing system, responsively processing the data structure to select a first determination process from a plurality of determination processes wherein the data structure includes a plurality of records indicating different ranges of device identifiers and location capabilities and wherein the device identifier is included in a first range of the different ranges and wherein a first record of the plurality of records indicates the first range of the different ranges and indicates a first location capability of the location capabilities and wherein each of the plurality of determination processes corresponds to each of the location capabilities.

The method further comprises, in the provisioning system, processing the data structure to determine if each of the location capabilities indicated in each of the records are correct for each of the different ranges indicated in each of the records, transferring the data structure to the location determination system if each of the location capabilities are correct, and generating an error response if each of the location capabilities are not correct.

In an embodiment of the invention, the location capabilities indicate mobile positioning capabilities of devices assigned the device identifiers.

In an embodiment of the invention, the mobile positioning capabilities comprise at least a one of a global positioning system capability, a triangulation capability, and a hybrid capability having both the global positioning system capability and the triangulation capability.

In an embodiment of the invention, the method further comprises, in the location determination system a position determining system executing the first determination process to determine the location of the device and a mobile positioning center (MPC) coupled to the position determining system, the provisioning system, and the call processing system, and instructing the position determining system to execute the first determination process, interfacing with the provisioning system, and interfacing with the call processing system.

In an embodiment of the invention, the provisioning system comprises a mobile application provisioning system (MAPS).

In an embodiment of the invention, the call processing system comprises a mobile switching center (MSC).

In an embodiment of the invention, the device comprises a mobile device.

In an embodiment of the invention, the device comprises a wireless device.

In an embodiment of the invention, a communication system comprises a call processing system configured to receive from a device a call request for emergency service indicating a device identifier, process the call request to setup a call for the emergency service between the device and a public safety answering point, transfer an initiation request including the device identifier to a location determination system to initiate a first determination process to determine a location of the device.

In an embodiment, the communication system further comprises the location determination system configured to receive a data structure from a provisioning system, receive the initiation request from the call processing system, responsively process the data structure to select a first determination process from a plurality of determination processes wherein the data structure includes a plurality of records indicating different ranges of device identifiers and location capabilities and wherein the device identifier is included in a first range of the different ranges and wherein a first record of the plurality of records indicates the first range of the different ranges and indicates a first location capability of the location capabilities and wherein each of the plurality of determination processes corresponds to each of the location capabilities.

In an embodiment, the communication system further comprises the provisioning system configured to process the data structure to determine if each of the location capabilities indicated in each of the records are correct for each of the different ranges indicated in each of the records, transfer the data structure to the location determination system if each of the location capabilities are correct, and generate a error response if each of the location capabilities are not correct.

BRIEF DESCRIPTION OF THE DRAWINGS

The same reference number represents the same element on all drawings.

FIG. 6 illustrates a data structure in an embodiment of the invention.

DETAILED DESCRIPTION OF THE PREFERRED EMBODIMENT

FIGS. 2-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
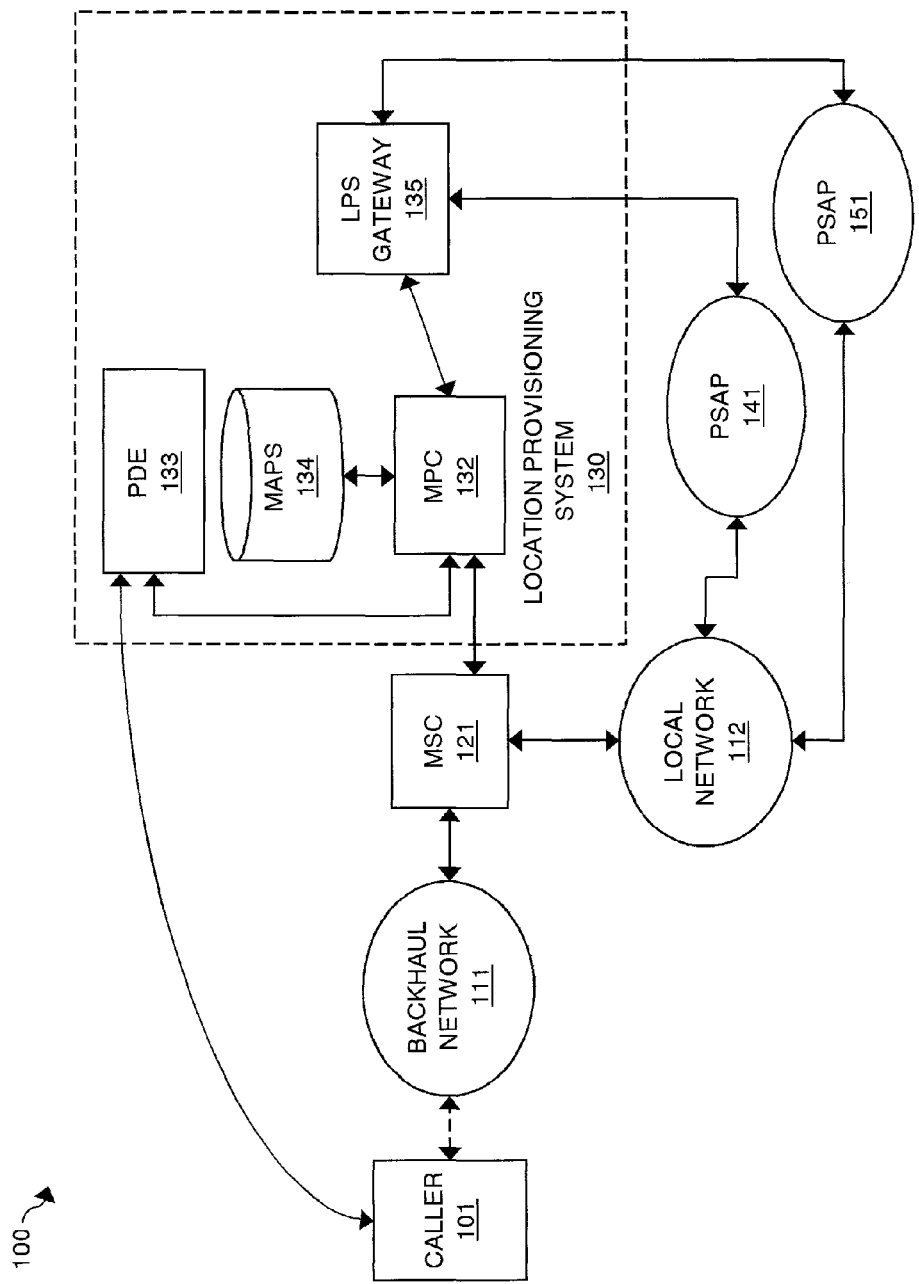
FIG. 1 illustrates a communication network in an example of the prior art.
Figure 2:
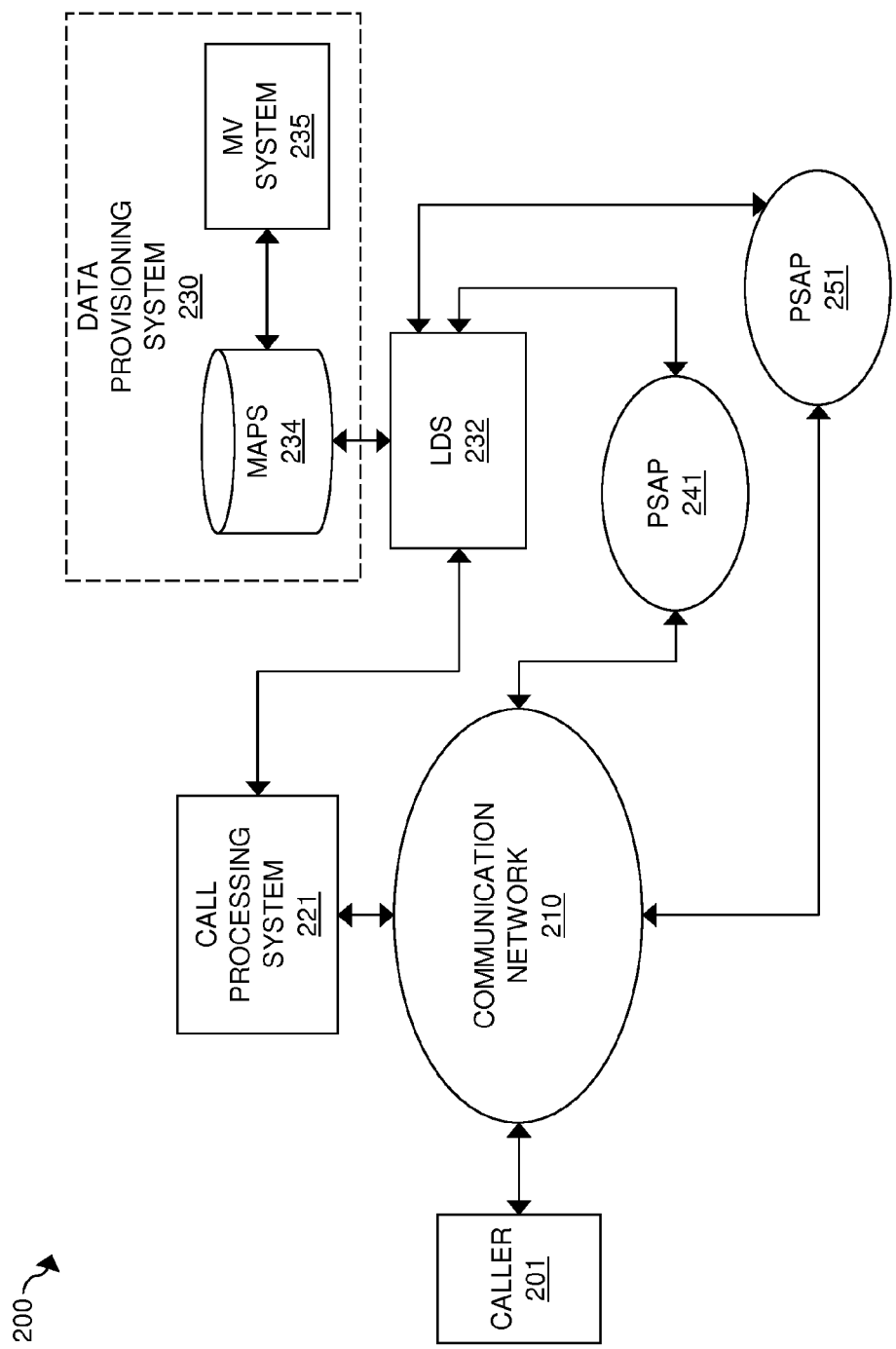
FIG. 2 illustrates a communication network in an embodiment of the invention.

FIG. 2 illustrates communication network 200 in an embodiment of the invention. Communication network 200 includes caller 201 in communication with call processing system (CPS) 221 over communication network 210. It should be understood that local communication network 210 could include a collection of communication networks. Caller 201 could be, for example, a mobile caller. CPS 221 is operatively coupled to public safety answering point (PSAP) 241 and PSAP 251 over communication network 210. CPS 221 is also operatively coupled to location determination system (LDS) 232 for initiating location determination processes. LDS 232 is operatively coupled to mobile application provisioning system (MAPS) 234 within data provisioning system 230. PSAP 241 is operatively coupled to LDS 232, as is PSAP 251. Data provisioning system 230 further includes MAPS verification (MAPS VERIFICATION) system 235 coupled to MAPS 234.

Figure 3:
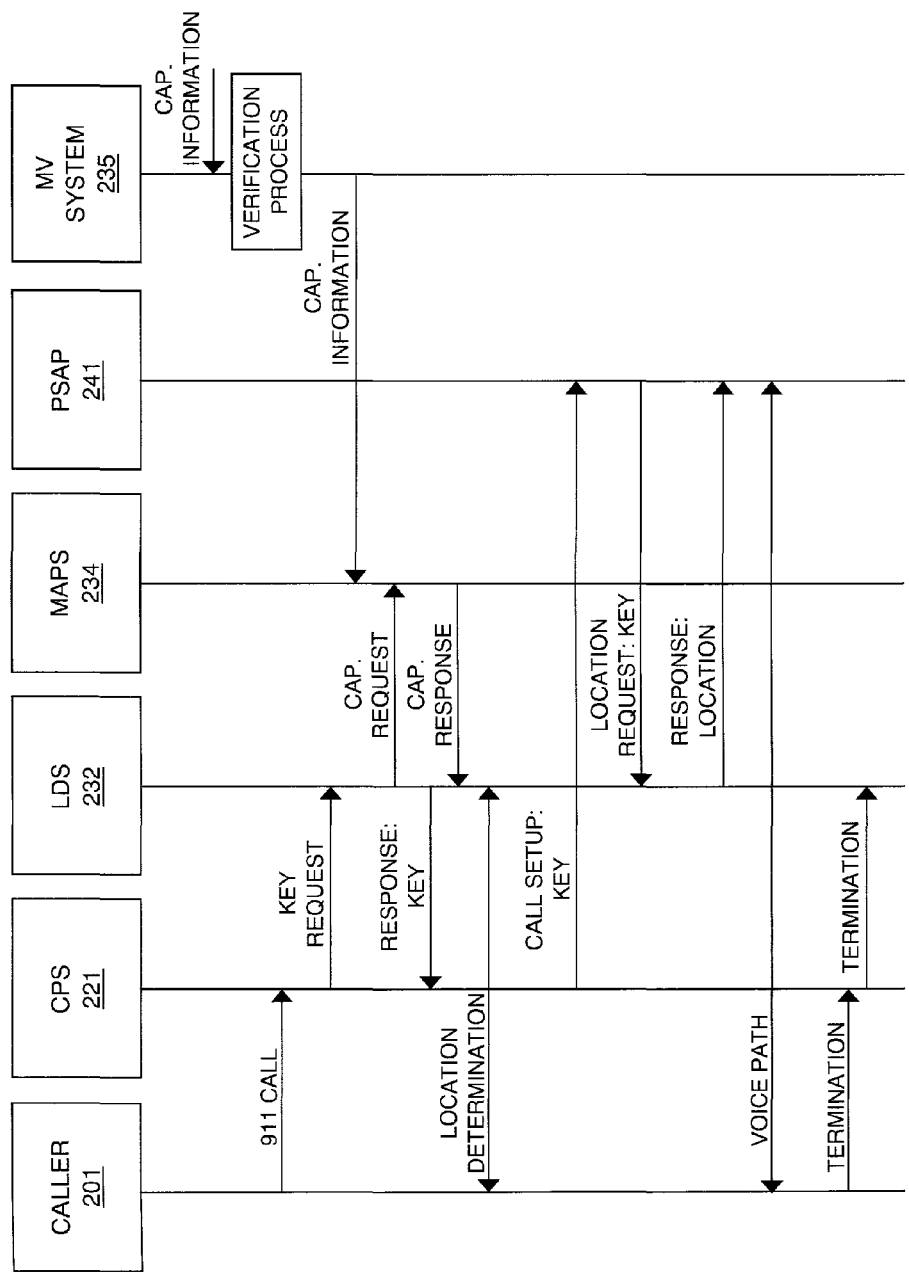
FIG. 3 illustrates the operation of a communication network in an embodiment of the invention.

FIG. 3 illustrates the operation of communication network 200 in an embodiment of the invention. In operation, caller 201 could encounter a situation that requires an emergency service. Caller 201 could responsively place a 911 call to CPS 221. CPS 221 recognizes the call as requesting emergency services and initiates multiple call processes to handle the 911 call.

One call process involves CPS 221 communicating with either PSAP 241 or PSAP 251 to setup the 911 call between caller 201 and the appropriate PSAP. For this example, it is assumed that PSAP 241 is the appropriate PSAP.

Another call process involves CPS 221 communicating with LDS 232 to initiate a location determination process in order to physically locate caller 201. LDS 232 operates to locate caller 201. A number of well known location applications could be utilized or executed elements within LDS 232 to locate caller 201, depending upon the positioning capabilities of the device used by caller 201. LDS retains and maintains the location of caller 201 for later distribution to other network elements, such as PSAPs 241 and 251.

Eventually, CPS 221 connects the emergency call through communication network 210 to PSAP 241. As part of the call setup process, CPS 221 requests a key from LDS 232 that is used to track the call and correlate information on the call. CPS 221 forwards the key to PSAP 241 during call setup. PSAP 241 queries LDS 232 with the key to obtain location information generated by the location determination processes initiated by LDS 232.

In this example, LDS 232 communicates with caller 201 or other network elements, such as base transceiver stations, to obtain the location of the caller. LDS 232 returns the location information to PSAP 241. Emergency personnel can then be directed by PSAP 241 to the location of caller 201.

LDS 232 typically processes data structures that hold or store a list of devices, often times identified by a device identifier, along with various attributes of each device, such as the location or positioning determining capability or capabilities of each device. The data structures are often times in the form of call processing tables, database, or the like. Examples of positioning capabilities include global positioning system (GPS) capabilities, triangulation capabilities, or a hybrid combination of both capabilities.

When a location determination process is initiated, LDS 232 internally queries a device list to determine the positioning capabilities of the device for which a location is sought. Depending upon the capability of the device, LDS 232 instructs positioning equipment to seek the location accordingly. For example, if a device has GPS capabilities, LDS 232 utilizes a GPS application to locate the device. If the device lacks GPS capabilities, but does have limited triangulation capabilities, LDS 232 locates the device utilizing triangulation techniques. Other location or positioning determining techniques or processes are known.

MAPS 234 is typically used as a provisioning system for the data structures processed by LDS 232 when determining the positioning capabilities of mobile devices. LDS 232 is programmed or otherwise configured to periodically access MAPS 234 to update internal data structures, such as those tables or databases holding device positioning capability information.

The data structures stored in MAPS 234 are initially data filled or otherwise generated. MAPS verification system 235 advantageously processes the data structures to ensure the integrity of the data structures. As a result, the device capabilities of ranges of devices are correctly input into a particular table or other such data structure stored in MAPS 234. As a result, correct data is now loaded into LDS 232 for use during location determination processes.

Figure 4:
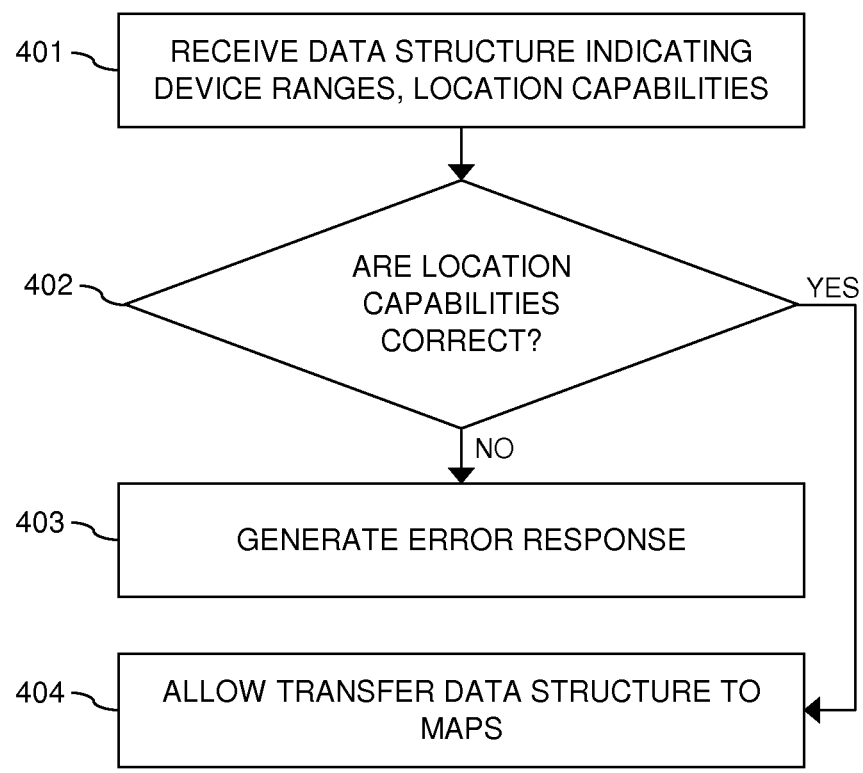
FIG. 4 illustrates the operation of a verification system in an embodiment of the invention.

FIG. 4 illustrates the operation of MAPS verification system 235 in an embodiment of the invention. To begin, MAPS verification system 235 reads, loads, or otherwise receives a data structure indicating device ranges and their associated capabilities (Step 401). Next, MAPS verification system 235 automatically processes the data structure to determine if the location capabilities stored in the data structure are correct (Step 402). If so, MAPS verification system 235 sends, provides, or otherwise allows the data structure to proceed to MAPS 234 (Step 404). If not, MAPS verification system 235 generates an alarm alerting personnel that the data structure contains errors (Step 403). The alarm could be, for example, a message displayed by a graphical user interface on a computer system.

Figure 5:
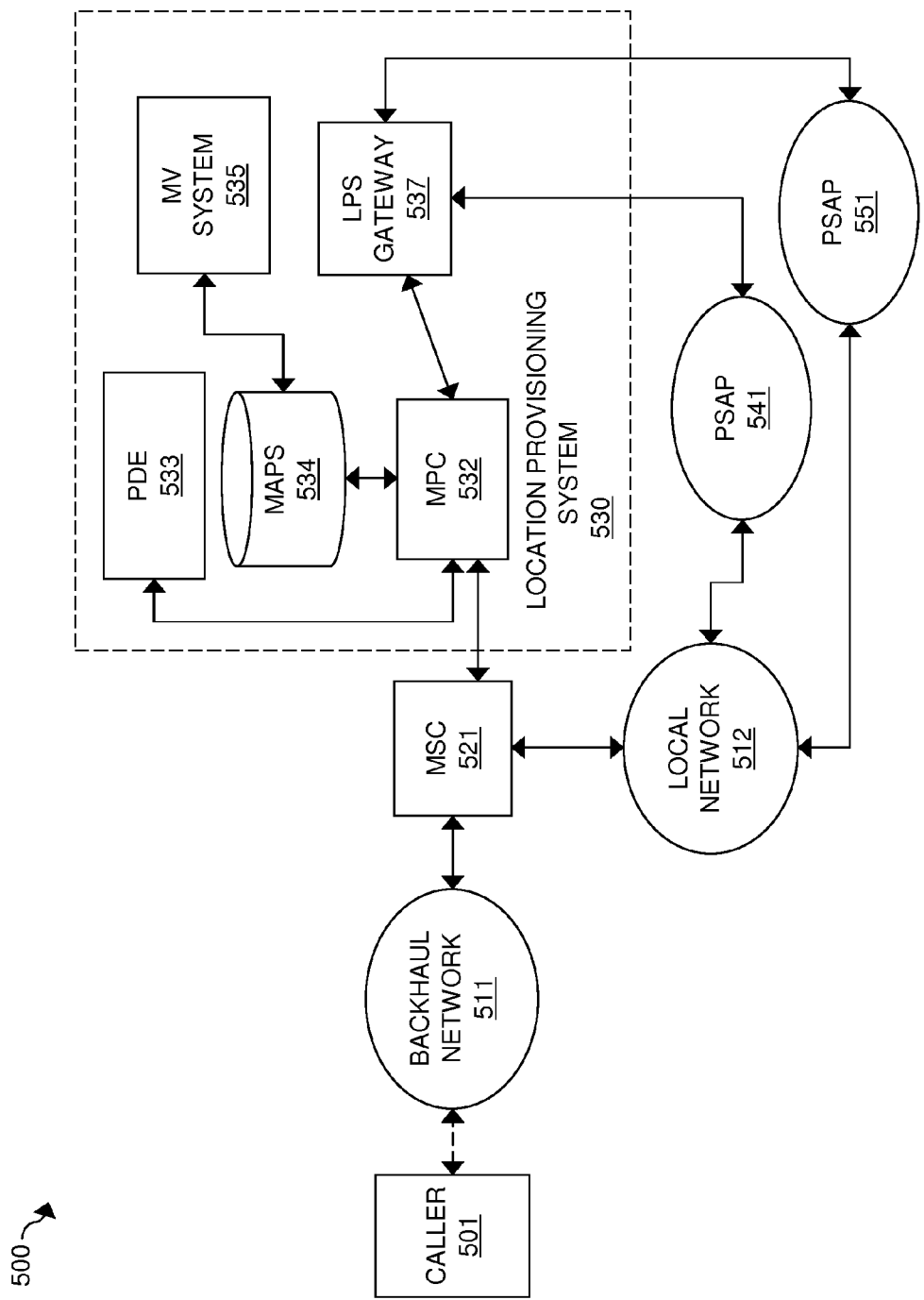
FIG. 5 illustrates a communication network in an embodiment of the invention.

FIG. 5 illustrates communication network 500 in an embodiment of the invention. Communication network 500 includes caller 501 in communication with mobile switching center (MSC) 521 over backhaul network 511. Caller 501 is a mobile wireless caller. MSC 521 is operatively coupled to public safety answering point (PSAP) 541 and PSAP 551 over local network 512. MSC 521 is also operatively coupled to location provisioning system (LPS) 530, and in particular, to mobile positioning center (MPC) 532. MPC 532 is operatively coupled to mobile application provisioning system (MAPS) 534, position determining equipment (PDE) and LPS gateway 535. PSAP 541 is operatively coupled to LPS gateway 535, as is PSAP 551. LPS 530 further includes MAPS verification (MAPS VERIFICATION) system 535 coupled to MAPS 534.

In an operational example of an embodiment of the invention, caller 501 could encounter a situation that requires an emergency service. Caller 501 could responsively place a 911 call to MSC 521. MSC 521 recognizes the call as requesting emergency services and initiates multiple call processes to handle the 911 call.

One call process involves MSC 521 communicating via local network 512 with either PSAP 541 or PSAP 551 to setup the 911 call between caller 501 and the appropriate PSAP. For this example, it is assumed that PSAP 541 is the appropriate PSAP.

Another call process involves MSC 521 communicating with MPC 532 to initiate a location determination process in order to physically locate caller 501. MPC 532 communicates with PDE 533 to locate caller 501. A number of location applications could be utilized or executed by PDE 533 to locate caller 501, depending upon the positioning capabilities of the device used by caller 501. PDE 533 returns the location of caller 501 to MPC 532 for later distribution.

Eventually, MSC 521 connects the emergency call through to PSAP 541. As part of the call setup process, MSC 521 requests a key from MPC 532 that is used to track the call and correlate information on the call. MSC 521 forwards the key to PSAP 541 during call setup. PSAP 541 queries LPS gateway 535 with the key to obtain location information generated by the location determination processes initiated by MPC 532. LPS gateway 537 typically interfaces between multiple PSAPs and multiple MPCs.

In this example, LPS gateway 537 obtains the location of the caller from MPC 532 and returns the location information to PSAP 541. Emergency personnel can then be directed by PSAP 541 to the location of caller 501.

MPC 532 typically processes data structures that hold or store a list of devices, often times identified by a device identifier, along with various attributes of each device, such as the location or positioning determining capability or capabilities of each device. The data structures are often times in the form of call processing tables, database, or the like. Examples of positioning capabilities include global positioning system (GPS) capabilities, triangulation capabilities, or a hybrid combination of both capabilities.

FIG. 6 illustrates a data structure 601 in an embodiment of the invention. Data structure 601 could be, for example, a call processing table. Other types of data structures are possible. Data structure 601 has rows 602 and columns 603. The rows 602 are identified by ranges, such as RANGE A, RANGE B, RANGE C . . . RANGE n. The ranges are defined by a low end of the range and a high end of the range. The first column indicates the low end of a range. The second column indicates the high end of a range. For example, RANGE A is defined as those device identifiers between X1 and Y1. RANGE B is defined as those device identifiers between X2 and Y2. RANGE C is defined as those device identifiers between X3 and Y3. RANGE n is defined as those device identifiers between Xn and Yn. The third column identifies the mobile positioning capability (MPCAP) of the devices in each range. In this example, the MPCAP value could range from 1 to 3. It should be understood that other values are possible. The MPCAP values correspond to the positioning or location capabilities described above, such as GPS, triangulation, or a hybrid combination. Other types of MPCAPs are possible.

When a location determination process is initiated, MPC 532 internally queries a device list to determine the positioning capabilities of the device for which a location is sought. Depending upon the capability of the device, MPC 532 instructs PDE 533 to seek the location accordingly. For example, if a device has GPS capabilities, MPC 532 instructs PDE 533 to utilize a GPS application to locate the device. If the device lacks GPS capabilities, but does have limited triangulation capabilities, MPC 532 instructs PDE 533 to locate the device utilizing triangulation techniques. Other location or positioning determining techniques or processes are known.

MAPS 534 is typically used as a provisioning system for the data structures processed by MPC 532 when determining the positioning capabilities of mobile devices. MPC 532 is programmed or otherwise configured to periodically access MAPS 534 to update internal data structures, such as those tables or databases holding device positioning capability information.

The data structures stored in MAPS 534 are initially data filled or otherwise generated. MAPS VERIFICATION system 535 advantageously processes the data structures to ensure the integrity of the data structures. As a result, the device capabilities of ranges of devices are correctly input into a particular table or other such data structure stored in MAPS 534. As a result, correct data is now loaded into MPC 532 for use during location determination processes.

In particular, MAPS VERIFICATION system 535 reads, loads, or otherwise receives a data structure indicating device ranges and their associated capabilities. Next, MAPS VERIFICATION system 535 automatically processes the data structure to determine if the location capabilities stored in the data structure are correct. If so, MAPS-VERIFICATION system 535 sends, provides, or otherwise allows the data structure to proceed to MAPS 534. If not, MAPS VERIFICATION system 235 generates an alarm alerting personnel that the data structure contains errors. The alarm could be, for example, a message displayed by a graphical user interface on a computer system.

Figure 7:
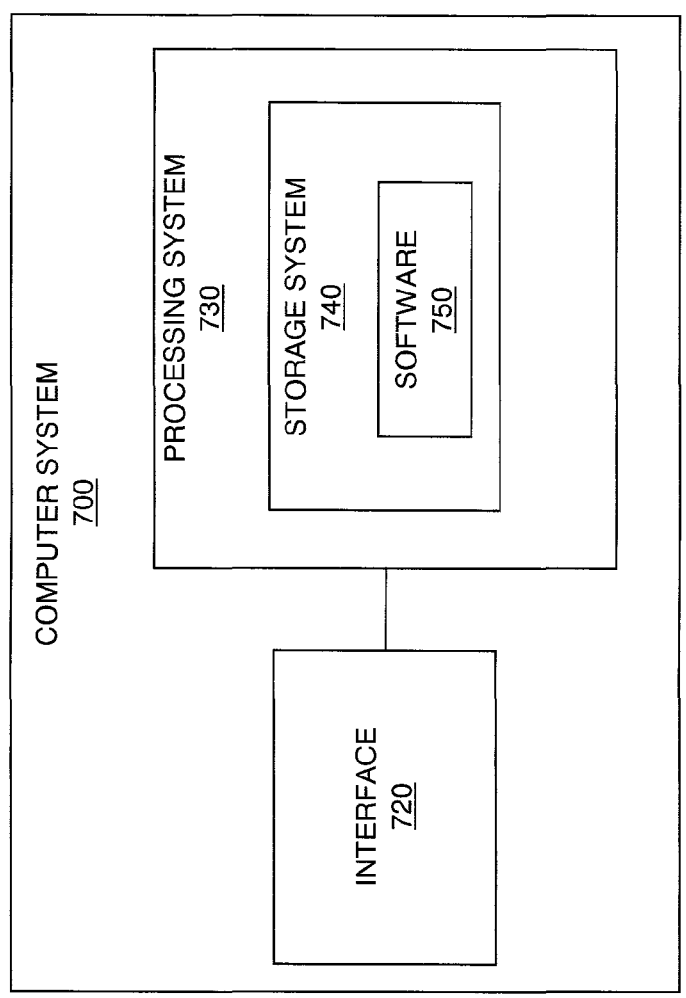
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Interface 720 may be distributed among multiple communication devices. Interface 730 could comprise a computer microprocessor, logic circuit, or some other processing device. Processing system 730 may be distributed among multiple processing devices. Storage system 740 could comprise a disk, tape, integrated circuit, server, or some other memory device or medium. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described above for the elements of communication network 100 or communication network 500, such as call processing system 221, MAPS verification system 235, location determination system 232, MAPS 234, MSC 521, MPC 532, MAPS 534, and MAPS verification system 535, as well as other elements.

Those skilled in the art will appreciate variations from these embodiments that fall within the scope of the invention. Those skilled in the art will appreciate that the features described above could be combined in various ways to form multiple embodiments of the invention. As a result, the invention is not limited to the specific embodiments described above, but only by the claims and their equivalents.

What is claimed is:

1. A communication system comprising:
a call processing system configured to receive from a device a call request for emergency service indicating a device identifier, process the call request to setup a call for the emergency service between the device and a public safety answering point, transfer an initiation request including the device identifier to a location determination system to initiate a first determination process to determine a location of the device;
the location determination system configured to, prior to the call processing system receiving the call request from the device, receive a data structure from a provisioning system;
the location determination system further configured to receive the initiation request from the call processing system, responsively process the data structure to select a first determination process from a plurality of determination processes wherein the data structure includes a plurality of records indicating different ranges of device identifiers and location capabilities and wherein a first record of the plurality of records indicates a first range of the different ranges and indicates a first location capability of the location capabilities and wherein each of the plurality of determination processes corresponds to each of the location capabilities; and
the provisioning system configured to, prior to the call processing system receiving the call request from the device, process the data structure to determine if each of the location capabilities indicated in each of the records are correct for each of the different ranges indicated in each of the records, transfer the data structure to the location determination system if each of the location capabilities are correct, and generate a error response if each of the location capabilities are not correct.

2. The communication system of claim 1 wherein the location capabilities indicate mobile positioning capabilities of devices assigned the device identifiers.

3. The communication system of claim 2 wherein the mobile positioning capabilities comprise at least a one of a global positioning system capability, a triangulation capability, and a hybrid capability having both the global positioning system capability and the triangulation capability.

4. The communication system of claim 1 wherein the location determination system comprises:
   a position determining system configured to execute the first determination process to determine the location of the device; and
   a mobile positioning center (MPC) coupled to the position determining system, the provisioning system, and the call processing system, and configured to instruct the position determining system to execute the first determination process, interface with the provisioning system, and interface with the call processing system.

5. The communication system of claim 4 wherein the provisioning system comprises a mobile application provisioning system (MAPS).

6. The communication system of claim 4 wherein the call processing system comprises a mobile switching center (MSC).

7. The communication system of claim 1 wherein the device comprises a mobile device.

8. The communication system of claim 1 wherein the device comprises a wireless device.

9. A method of operating a communication system comprising:
   in a call processing system, receiving from a device a call request for emergency service indicating a device identifier, processing the call request to setup a call for the emergency service between the device and a public safety answering point, and transferring an initiation request including the device identifier to a location determination system to initiate a first determination process to determine a location of the device;
   in the location determination system, prior to the call processing system receiving the call request from the device, receiving a data structure from a provisioning system;
   in the location determination system, receiving the initiation request from the call processing system, responsively processing the data structure to select a first determination process from a plurality of determination processes wherein the data structure includes a plurality of records indicating different ranges of device identifiers and location capabilities and wherein a first record of the plurality of records indicates a first range of the different ranges and indicates a first location capability of the location capabilities and wherein each of the plurality of determination processes corresponds to each of the location capabilities; and
   in the provisioning system, prior to the call processing system receiving the call request from the device, processing the data structure to determine if each of the location capabilities indicated in each of the records are correct for each of the different ranges indicated in each of the records, transferring the data structure to the location determination system if each of the location capabilities are correct, and generating an error response if each of the location capabilities are not correct.

10. The method of claim 9 wherein the location capabilities indicate mobile positioning capabilities of devices assigned the device identifiers.

11. The method of claim 10 wherein the mobile positioning capabilities comprise at least a one of a global positioning system capability, a triangulation capability, and a hybrid capability having both the global positioning system capability and the triangulation capability.

12. The method of claim 9 comprising, in the location determination system a position determining system executing the first determination process to determine the location of the device and a mobile positioning center (MPC) coupled to the position determining system, the provisioning system, and the call processing system, and instructing the position determining system to execute the first determination process, interfacing with the provisioning system, and interfacing with the call processing system.

13. The method of claim 12 wherein the provisioning system comprises a mobile application provisioning system (MAPS).

14. The method of claim 12 wherein the call processing system comprises a mobile switching center (MSC).

15. The method of claim 9 wherein the device comprises a mobile device.

16. The method of claim 9 wherein the device comprises a wireless device.

* * * * *